United States Patent [19]

Noristi et al.

[11] 4,380,507

[45] Apr. 19, 1983

[54] CATALYSTS FOR POLYMERIZING ETHYLENE

[75] Inventors: Luciano Noristi; Giovanni Baruzzi, both of Ferrara, Italy

[73] Assignee: Montedison S.p.A., Milan, Italy

[21] Appl. No.: 324,419

[22] Filed: Nov. 24, 1981

Related U.S. Application Data

[63] Continuation of Ser. No. 802,367, Jun. 2, 1977, abandoned.

[30] Foreign Application Priority Data

Jun. 3, 1976 [IT] Italy .............................. 23903 A/76

[51] Int. Cl.³ .......................... C08F 4/02; C08F 10/02
[52] U.S. Cl. .............................. 252/429 B; 252/429 C; 526/119; 526/125; 526/127; 526/137; 526/352
[58] Field of Search ....................... 252/429 B, 429 C

[56] References Cited

U.S. PATENT DOCUMENTS 3,766,158 10/1973 Yamaguchi et al. ................. 526/116
3,817,969 6/1974 Tamm et al. .......................... 526/909
3,843,620 10/1974 Pickarski et al. ..................... 526/909
3,941,760 3/1976 Herbeck et al. ...................... 526/909
4,022,958 5/1977 Matsuura et al. .................... 526/125

FOREIGN PATENT DOCUMENTS 1286867 8/1972 United Kingdom ................ 526/125
1292853 10/1972 United Kingdom ................ 526/125
1391322 4/1975 United Kingdom ................ 526/151

*Primary Examiner*—Edward J. Smith

[57] ABSTRACT

Catalysts for polymerizing ethylene to high yields of polyethylene having a controlled particle size are disclosed. The catalysts are prepared from new catalyst-forming components which are the reaction products of solid halogenated titanium compounds, Grignard compounds and halogenating agents. Said components, on mixing with organometallic compounds of metals belonging to Groups I-III of the Mendelyeev Periodic Table result in the catalysts capable of polymerizing ethylene to polyethylene having a controlled particle size.

4 Claims, No Drawings

CATALYSTS FOR POLYMERIZING ETHYLENE

This is a continuation of application Ser. No. 802,367 filed June 2, 1977, now abandoned.

THE PRIOR ART

It is known to polymerize ethylene to polyethylene with the aid of catalysts of various types, in particular with the aid of catalysts consisting of the products obtained by mixing titanium compounds with organometallic compounds of metals belonging to Groups I to III of the Mendelyeev Periodic Table, such as the products obtained by mixing $TiCl_4$ or $TiCl_3$ with an aluminum trialkyl or a dialkyl aluminum monohalide. However, such catalysts do not exhibit an activity which is sufficiently high for the production of polyethylene on a commercial scale.

Catalysts which are much more highly active in the polymerization of ethylene to polyethylene and in which the titanium compound is supported on a magnesium dihalide, especially $MgCl_2$, in an activated state characterized by a very large surface area and/or by a modified X-rays powder spectrum which does not show the most intense diffraction lines as they appear in the spectrum of the normal, non-activated Mg dihalide, are now known. Exceptionally high yields of polyethylene in gms/gm of Ti used are obtained when ethylene is polymerized in contact with said catalysts one component of which is prepared by supporting the Ti compound on a support comprising the activated Mg dihalide. However, the polymer thus obtained exhibits a dispersed granulometry. That is to say the polymer particles are not of uniform or substantially uniform size.

THE PRESENT INVENTION

An object of this invention was to provide a process for polymerizing ethylene in contact with a catalyst one component of which comprises a Ti compound supported on a Mg dihalide in the active state but which, in addition to resulting in high yields of polyethylene in gms/gm of Ti used, also results in a particulate polyethylene having a controlled particle size.

That and other objects are achieved by the present invention in accordance with which ethylene, or a mixture thereof with alpha-olefins of the formula $CH_2=CHR$ in which R is an alkyl radical containing 1 to 6 carbon atoms, e.g., propylene or butene-1, is polymerized in contact with a catalyst one component of which is the reaction of a solid halogenated Ti compound, a Grignard compound and a halogenating agent.

The solid halogenated Ti compound used to prepare the aforesaid catalyst component is a $TiCl_3$ obtained by the reduction of $TiCl_4$ by different techniques or a solid Ti-halogen-alcoholate such as, e.g., $Cl_3TiOCH_3$.

The Grignard compounds used in preparing said catalyst component are those of the formula RMgX, in which X is Cl or Br and R is an alkyl, a cycloalkyl, or an aryl radical containing from 2 to 16 carbon atoms.

The halogenating agents used to prepare the catalyst component are those which react with the Grignard compound, decomposing it to Mg halide. Examples of such halogenating agents include $TiCl_4$, $SiCl_4$ and $PCl_3$.

The useful $TiCl_3$ can be obtained by reducing $TiCl_4$ with Al-alkyls, such as, for example, $Al_2Et_3Cl_3$ or $AlEt_2Cl$ ($B$-$TiCl_3$), or by reduction of $TiCl_4$ with Al metal. In the latter case, the $TiCl_3$ is successively activated by dry-grinding.

The $TiCl_3$ obtained by reduction of $TiCl_4$ with Al-alkyls can be used, also, in an activated state attainable by heat treatment.

Furthermore, the $TiCl_3$ used may be obtained by reduction of $TiCl_4$ with hydrogen, followed by activation thereof by grinding.

In a presently preferred embodiment of the invention, the Grignard compounds used are the Mg-alkyl chlorides in which the alkyl contains from 2 to 12 carbon atoms. Good results have also been obtained using the Mg-alkyl bromides in which the alkyl contains from 4 to 8 carbon atoms.

Also, in the presently preferred embodiment, the halogenating agent used is $TiCl_4$ or $SiCl_4$. $PCl_3$ gives a polymer having a narrow particle-size distribution but the particles are very small (mean diameter$=155\mu$), which is of particular advantage in some uses to which the polymer is put in practice.

The new catalyst components of the invention are prepared by reacting the solid halogenated Ti compound with the Grignard compound in an aliphatic hydrocarbon, such as n-hexane or n-heptane, at a temperature between 35° and 40° C., according to a molar ratio Grignard compound/Ti-compound of at least 7. In practice, for reasons of economy, it is not advisable to employ ratios higher than 12. Such reaction generally takes 2 to 4 hours.

The reaction product, separated by filtration, is reacted with the halogenating agent at a temperature ranging from 0° to 150° C., preferably at 100°–110° C., according to a halogenating agent/Grignard compound molar ratio higher than 0.5 and in particular comprised between 0.5 and 5. In practice, the preferred ratio is equal to 2 or a little higher, e.g., up to 2.5. The reaction can be conducted in the presence of an inert hydrocarbon, such as n-hexane or n-heptane.

The catalytic components prepared as described are used in combination with organometallic compounds of metals belonging to Groups I to III of the [Mendelyeev] Periodic Table, preferably an Al-trialkyl, such as Al-triethyl or Al-triisobutyl, according to an Al/Ti ratio higher than 1 and generally comprised between 1 and 1000, in particular between 5 and 200. The particle size distribution of the polymer is measured by the set of ASTM-E 11 screens according to method ASTM D 1921-63. The analytical results are determined in conformity with a calculus program by a computer that provides the parameters of the particle size distribution and the distribution diagram.

The mean diameter of the polymer particles is calculated by the Reboux formula:

$$\text{mean diameter} = \frac{100}{\Sigma(x_i/\phi_i)}$$

in which $\phi_i$ indicates the geometrical mean diameter of the percentage by weight $x_i$ of polymer retained between two consecutive screens.

The dispersion, which defines the width of the particle-size distribution, is given by the formula:

$$\text{dispersion} = \frac{P_{84} - P_{16}}{2}$$

in which $P_{84}$ and $P_{16}$ represent the so-called "percentile diameters", which can be calculated on the basis of the cumulative curve of the particle-size distribution.

Such curve is drawn by plotting on the abscissa the diameter x of the particles and on the ordinate the percentage y of polymer having x as maximum diameter of its particles, i.e., the percentage of polymer in particles having a diameter $\leq$ x.

Using the distribution cumulative curve it is possible to find, on the abscissa, the "percentile diameter" $P_y$ corresponding to a given percentage y of polymer: so, in correspondence of 16% and of 84% of the polymer it is possible to find, on the abscissa, the values of $P_{16}$ and $P_{84}$ expressed, for example, in micron.

Satisfactory particle-size distributions are those corresponding to dispersion values not higher than 0.2.

The polymerization of ethylene and of mixtures thereof with lesser amounts of alpha-olefins in the presence of the above-described catalysts is conducted according to known methods, at a temperature ranging from 0° to 150° C., preferably from 50° to 80° C., by operating in a liquid phase either in the presence or in the absence of an aliphatic hydrocarbon, such as n-hexane or n-heptane, or in the gas phase. The Al-organic compound is employed in an amount corresponding to 2 g/liter of the reaction medium.

In the following examples, given to illustrate the invention, and not intended as limiting, the polymerization of ethylene was carried out at 85° C. in n-hexane, at an ethylene and hydrogen pressure of 6 and 7 atm. gauge respectively.

EXAMPLE 1

(a) Preparation of the catalyst component of the invention

N-octyl-magnesium chloride (n-$C_8H_{17}$MgCl) was prepared by introducing into a 2-liter flask equipped with a stirrer, 500 ml of anhydrous diethyl ether and 22.3 g of magnesium in powder form and activated with Li-butyl.

The mixture was heated at reflux and 20 ml of a solution obtained from 153 ml of n-octyl chloride and from 50 ml of anhydrous diethyl ether were quickly added dropwise. The remaining portion of such solution was added in 2 hours and 30 minutes, and the whole was allowed to stand at reflux for 12 hours. Successively, the unreacted magnesium was removed by filtration on a fritted bottom G 3, thus obtaining a limpid solution of the Grignard compound in ether, from which the ether was removed by substitutive distillation with anhydrous n-hexane, until a temperature of 67°–68° C. was reached at the top of the column.

At the conclusion of the operation, 1000 ml of a suspension containing 0.85 moles of n-$C_8H_{17}$MgCl were obtained, the yield being about 95% calculated on the octyl chloride employed. The residual ether in the suspension was equal to about 2% by weight.

$TiCl_3$ type TR was prepared by reducing $TiCl_4$ with $Al_2Et_3Cl_3$ at 10° C. in n-heptane, with an Al/Ti atomic ratio equal to 1.26, and operating as follows: a solution of 45% by weight of $TiCl_4$ in n-heptane was gradually added, in 90 minutes and under stirring, to the amount of $Al_2Et_3Cl_3$ necessary to arrive at an Al/Ti ratio equal to 1.26. The whole was kept under stirring for 3 hours at 10° C. and then was allowed to stand for 8–10 hours. After 2 washings with n-heptane the product was thermally activated for 2 hours at 130° C., to obtain a violet compound consisting of $TiCl_3.nAlCl_3$ of type $\delta$ and having the following composition: total Ti=20.40%; $Ti^{3+}$=20.4%; Al=5.55%; Cl=68.75%.

2.65 g of the $TiCl_3$TR (11.3 m/moles) and 100 ml of a suspension of n-$C_8H_{17}$MgCl (85 m/moles) were introduced into a 250 ml flask equipped with a stirrer. The mass was heated to 35° C. and kept at such temperature for 4 hours. After filtration, 5 washings with anhydrous n-heptane were carried out, whereupon the product was dried under vacuum. A solution of 30 ml of $TiCl_4$ in 30 ml of n-heptane was then added, and the whole was heated to 65° C. and kept under stirring for 2 hours. After filtration, 5 washings with n-heptane were effected and, finally, the product was dried under vacuum.

A violet powder having the following composition was thus obtained: total Ti=10%; $Ti^{3+}$=7.05%; Mg=12.3%; Al=0.8%; Cl=68.2%. Surface area=31.7 $m^2/g$.

(B) POLYMERIZATION OF ETHYLENE

The polymerization was conducted in a stainless steel autoclave having a capacity of 1.8 l, equipped with a stirring device and with a thermoregulating circuit. After degassing with hot $N_2$, the following materials were introduced:

- 750 ml of anhydrous n-hexane free from aromatic compounds;
- 1.6 g of Al-triisobutyl (TIBAL);
- 0.015 g of the catalyst component described in (a).

The temperature was rapidly brought to 85° C., $H_2$ was introduced up to a pressure of 7 kg/$cm^2$ gauge followed by the introduction of ethylene up to a pressure of 13 kg/$cm^2$ gauge. The polymerization was carried out for 4 hours, keeping the pressure constant by introducing ethylene. Polymerization was stopped, the polymer was separated by filtration, and dried at 70° C. in a nitrogen flow. 200 g of polyethylene were thus obtained, containing 4 ppm of residual titanium and having a melt index of 9.9 g/10 min. The mean diameter of the polymer particles was 0.343 mm and the dispersion was 0.12.

EXAMPLE 2

(a) Preparation of a catalyst component according to the invention

Example 1(a) was repeated but, using, instead of $TiCl_3$TR, a $\beta$-$TiCl_3$ prepared as follows: a solution of $TiCl_4$ in n-hexane was added, in 4 hours and under stirring, to an amount of $AlEt_2Cl$ such as to attain an Al/Ti atomic ratio=1, taking care to keep the temperature at 0° C. Once the introduction of $AlEt_2Cl$ was concluded, the mixture was kept at 0° C. for a further 30 minutes, then brought to 65° C. for 1 hour, and allowed to stand overnight. The reaction mass was filtered and the solid reaction product was washed five times with n-hexane, whereupon the product was dried under vacuum at 50° C.

On analysis, the brown powder obtained had the following composition: total Ti=21.85%; $Ti^{3+}$=21.80%; Al=4.25%; Cl=66%. On X-ray analysis the product was shown to be a $\beta$-$TiCl_3.nAlCl_3$.

After reaction with n-$C_8H_{17}$MgCl and $TiCl_4$ as in Example 1(a), a powder having the following composition was obtained:

total Ti=10.3%; $Ti^{3+}$=7.75%; Mg=13.9%; Al=0.2%; Cl=63.05%.

(B) PLYMERIZATION OF ETHYLENE

The polymerization was carried out as in Example 1(b), using 0.020 g of the catalytic component, (a). 198 g of polymer containing 9 ppm of residual Ti were obtained.
The melt index was 15.6 g/10 min.
Mean diameter=0.420 mm.
Dispersion=0.123.

EXAMPLE 3

(a) Preparation of a catalytic component of the invention

The TiCl$_3$ used was prepared by reduction of TiCl$_4$ with metal Al at 150°–160° C. and thereafter activated by dry-grinding in a ball mill, to obtain a δ-TiCl$_3$.0.33 AlCl$_3$ having the following composition: total Ti=23.75%; Ti$^{3+}$=23.45%; Al=4.60%; Cl=70.35%. After reaction with n-C$_8$H$_{17}$MgCl and TiCl$_4$ as in Example 1(a), a product having the following composition was obtained: total Ti=6.6%; Ti$^{3+}$=6.6%; Mg=14.85%; Al=0.9%; Cl=65.05%.

(B) POLYMERIZATION OF ETHYLENE

By operating as in Example 1(b), and using 0.016 g of catalytic component (a) there were obtained 175 g of polymer having a residual Ti content of 5 ppm, a melt index of 8.6 g/10 min., a mean diameter of 0.342 mm and a dispersion of 0.133.

By employing 0.037 g of TiCl$_3$ prepared as above, 188 g of polymer having the following characteristics were obtained:
residual Ti=39 ppm
melt index=0.49 g/10 min.
mean diameter=0.397 mm
dispersion=0.484.

EXAMPLE 4

An α-TiCl$_3$ of type HR, obtained by reduction of TiCl$_4$ with H$_2$ under conventional conditions, was used. The catalyst component obtained after reaction of the α-TiCl$_3$ with n-C$_8$H$_{17}$MgCl and TiCl$_4$, as in the preceding examples, exhibited the following composition: total Ti=10.15%; Mg=13.0%; Ti$^{3+}$=9.4%; Cl=68.75%.

The polymerization of ethylene in contact with a catalyst as in Example 1(b) and using 0.015 g of the catalytic component described in the foregoing paragraph yielded 126 g of polymer containing 7 ppm of residual Ti, and having a melt index of 11.3 g/10 min., a mean diameter of 0.321 mm, and a dispersion of 0.140.

The polymer obtained by using α-TiCl$_3$ (202 g from 0.037 g of catalytic component) contained 90 ppm of Ti, had a melt index of 0.54, a mean diameter of 0.841 mm and a dispersion of 0.946.

EXAMPLE 5

(a) Preparation of a catalyst component of the invention

The compound n-C$_{12}$H$_{25}$MgCl was prepared from Mg and n-C$_{12}$H$_{25}$Cl by operating according to the modalities described in Example 1(a) for the compound n-C$_8$H$_{17}$MgCl.

A suspension of the Grignard compound in n-hexane, with a yield of 92.5% and a residual content of ether equal to 0.8%, was obtained. It was reacted with TiCl$_3$TR in the same molar ratio as in Example 1(a). After reaction with TiCl$_4$ a product exhibiting the following composition was obtained: total Ti=9.7%; Ti$^{3+}$=7.3%; Mg=13.95%; Al=0.45%; Cl=63.75%.

(B) POLYMERIZATION OF ETHYLENE

Ethylene was polymerized under the same conditions as specified in the previous examples, using 0.023 g of the catalyst component (a). 231 g of polyethylene containing 8 ppm of residual Ti were obtained. The melt index was 4.45 g/10 min., the mean diameter 0.389 mm, the dispersion 0.117.

EXAMPLE 6

(a) Preparation of a catalyst component of the invention

The compound n-C$_4$H$_9$MgCl, obtained by the method described in Example 1(a) and with a yield of 87% and a residual ether content equal to 2.65%, was used. After reaction thereof with TiCl$_3$TR and then with TiCl$_4$, a product exhibiting the following composition was obtained: total Ti=11.2%; Ti$^{3+}$=7.75%; Mg=11.5%; Al=1.1% Cl=66.1%.

(B) POLYMERIZATION OF ETHYLENE

By polymerizing ethylene as in the previous examples, and using a catalyst prepared from 0.024 g of catalytic component (a) and the organometallic compound, there were obtained 215 g of polymer having the following characteristics:
residual Ti=7 ppm
melt index=7.3 g/10 min.
mean diameter=0.380 mm
dispersion=0.110.

EXAMPLE 7

(a) Preparation of a catalytic component of the invention

In this example, TiCl$_3$TR was reacted with n-C$_4$H$_9$MgBr prepared according to the usual modalities (yield=71%, residual ether=3.8%), and then with TiCl$_4$ as in Example 1(a).

The resulting catalyst component had the following composition: total Ti=12.15%; Ti$^{3+}$=7.05%; Mg=10.15%; Al=0.35%; (Cl+Br)=57.60% (thoroughly expressed as Cl).

(B) POLYMERIZATION OF ETHYLENE

Following the modalities of previous examples and employing 0.0195 g of catalytic component (a) in admixture with the organometallic compound of Example 1(b), there were obtained 230 g of polyethylene which had the following characteristics:
residual Ti=7 ppm
melt index=6.35 g/10 min.
mean diameter=0.353 mm
dispersion=0.119.

EXAMPLE 8

(a) Preparation of a catalyst component of the invention

Example 1(a) was repeated, employing TiCl$_3$ TR and n-C$_8$H$_{17}$MgCl, with the exception that, as halogenating agent, SiCl$_4$ was utilized instead of TiCl$_4$. A product having the following composition was obtained: total Ti=2.1%; Ti$^{3+}$=1.25%; Mg=7.95%; Al=0.25%; Cl=27.1%; Si: not determined.

(B) POLYMERIZATION OF ETHYLENE

By using 0.030 g of the aforesaid catalyst component (a) and operating as in Example 1(b), there were obtained 297 g of a polyethylene having a residual Ti<4 ppm, a melt index=19.2 g/10 min., a mean diameter=0.347 mm, and a dispersion=0.122.

EXAMPLE 9

(a) Preparation of a catalyst component of the invention

Example 1(a) was repeated but using $PCl_3$ as the halogenating agent instead of $TiCl_4$. The resulting product had the following composition: total Ti=2.4%; $Ti^{3+}$=0.95%; Mg=13.95%; Al=0.25%; Cl=64.35% P=6.3%.

(B) POLYMERIZATION OF ETHYLENE

By operating as in Example 1(b) and employing 0.36 g of the catalyst component, (a) described in this example, there were obtained 224 g of polyethylene having a residual Ti content<4 ppm. The melt index was 24 g/10 min., the mean diameter 0.155 mm and the dispersion 0.123.

EXAMPLE 10 (comparative test)

(a) Preparation of a catalyst component without using a solid halogenated titanium compound Only 50 ml of a suspension of n-$C_8H_{17}MgCl$ in n-hexane (equal to 44 m/moles) and 15 ml of $TiCl_4$ (136 m/moles) were reacted at 65° C. for 2 hours under stirring. The mass was filtered, and the reaction product washed 5 times with n-heptane, then dried under vacuum. The resulting powder had the following composition: total Ti=13%; $Ti^{3+}$=5.6%; Mg=12.55%; Cl=62.15%.

(B) POLYMERIZATION OF ETHYLENE

By operating as in Example 1(b) and employing 0.028 g of the above catalyst component, 163 g of polymer were obtained. The residual Ti was 22 ppm, the melt index 9.0 g/10 min., the mean diameter 0.524 mm and the dispersion 0.530.

This comparative test establishes that a catalyst as in Example 1(b) but prepared from a component obtained by simple reaction between the Mg compound and $TiCl_4$ does not yield, when mixed with the organometallic compound, a catalyst capable of polymerizing ethylene to polyethylene having a narrow particle-size distribution.

What we claim is:

1. The process for preparing components of catalysts for polymerizing ethylene or mixtures thereof with minor amounts of alpha-olefins of formula $CH_2=CHR$, in which R is an alkyl radical containing from 1 to 6 carbon atoms, said components comprising the product obtained by reacting a solid halogenated Ti compound selected from the group consisting of $TiCl_3$ and Ti halogen-alcoholates with a Grignard compound having the formula RMgX, in which R is an alkyl, cycloalkyl or aryl radical containing from 2 to 16 carbon atoms, and X is Cl or Br, in an aliphatic hydrocarbon, at a temperature between 35° and 40° C. and a Grignard compound/titanium compound molar ratio equal to at least 7, isolating the solid reaction product, and reacting it with a halogenating agent at a temperature between 0° and 150° C. and a halogenating agent/Grignard compound molar ratio higher than 0.5, said halogenating agent being selected from the group consisting of $TiCl_4$, $SiCl_4$ and $PCl_3$.

2. The process of claim 1, in which the halogenating agent/Grignard compound molar ratio is higher than 0.5 and up to 5.0.

3. The process of claim 1, in which the solid halogenated titanium compound is $TiCl_3$.

4. The process of claim 1, in which the Grignard compound is selected from the group consisting of n-$C_8H_{17}MgCl$, n-$C_{12}H_{25}MgCl$, n-$C_4H_9MgCl$ and n-$C_4H_9MgBr$.

* * * * *